United States Patent Office 3,386,753
Patented June 4, 1968

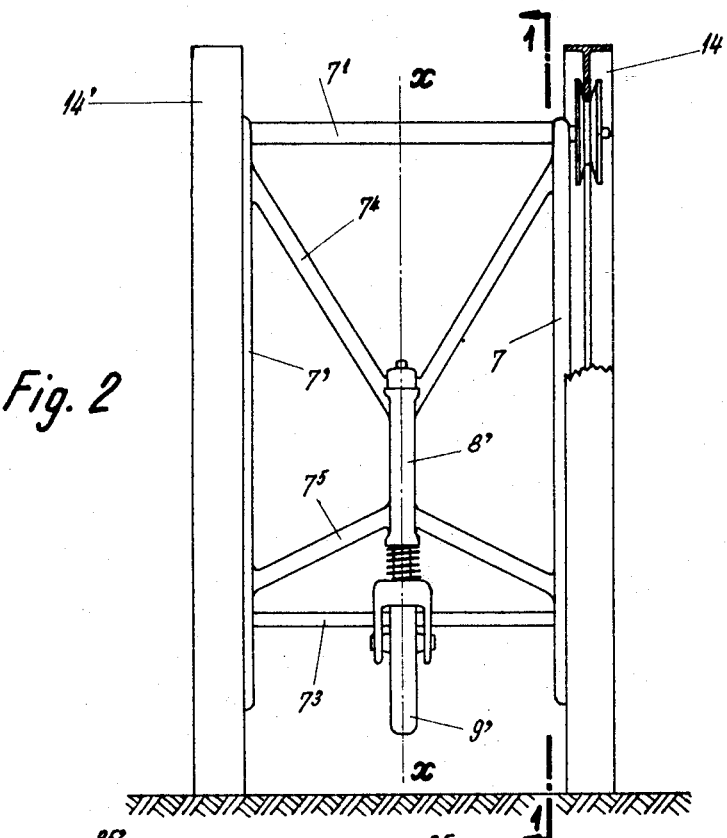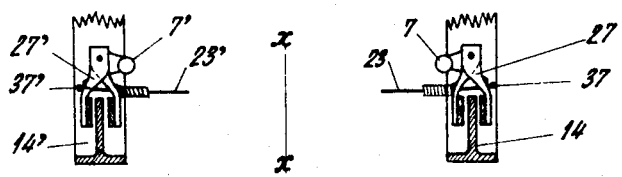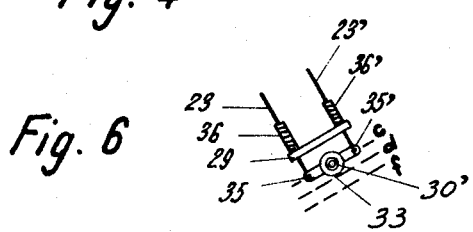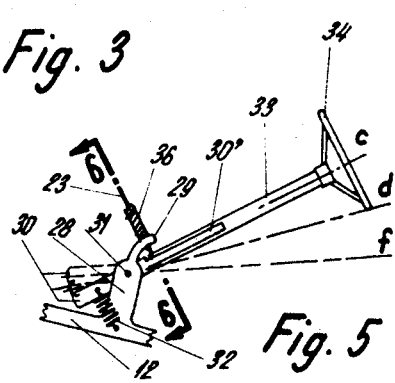
Fig. 2
Fig. 3
Fig. 4
Fig. 5
Fig. 6
INVENTOR
EDMOND QUEDREUX
By Young & Thompson
ATTYS.

3,386,753
OCCUPANT-PROPELLED VEHICLE THAT MOVES BY DISPLACEMENT OF ITS CENTER OF GRAVITY IN ADVANCE OF ITS GROUND SUPPORT
Edmond Quedreux, 56 Rue Henri Barbusse, Argenteuil, France
Filed Apr. 12, 1966, Ser. No. 542,043
Claims priority, application France, Apr. 27, 1965, 14,781
1 Claim. (Cl. 280—208)

ABSTRACT OF THE DISCLOSURE

An occupant-propelled vehicle has two large laterally spaced coaxial wheels and a vehicle body supported on and within inner annular surfaces of the wheels. The occupant drives the vehicle body along those support surfaces, so that when the center of gravity of the vehicle body is horizontally displaced from the axis of the wheels in one direction, the vehicle will move in that one direction.

The present invention relates to vehicles, more particularly of the type having ground-engaging wheels in which a vehicle body is moved relative to the wheels in such a way that the difference in horizontal displacement between the center of gravity of the ground-engaging wheels and the center of gravity of the vehicle body causes the vehicle to be propelled.

It is an object of the present invention to provide such a vehicle having improved brake means.

Another object of the present invention is the provision of such a vehicle having improved steering means.

Still another object of the present invention is the provision of such a vehicle having improved stabilizing means.

Finally, it is an object of the present invention to provide such a vehicle which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 2 is a front elevational view of a vehicle according to the present invention, with parts broken away for the purpose of fuller illustration;

FIGURE 3 is a fragmentary cross-sectional view taken on the line 3—3 of FIG. 1;

FIGURE 4 is a fragmentary cross-sectional view taken on the line 4—4 of FIG. 1, the planes $x$—$x$ in FIGS. 2, 3 and 4 being planes of symmetry;

FIGURE 5 is a fragmentary side elevational view of steering and backing mechanism according to the present invention; and FIGURE 6 is a fragmentary cross-sectional view taken on the line 6—6 of FIG. 5.

Figure 1:
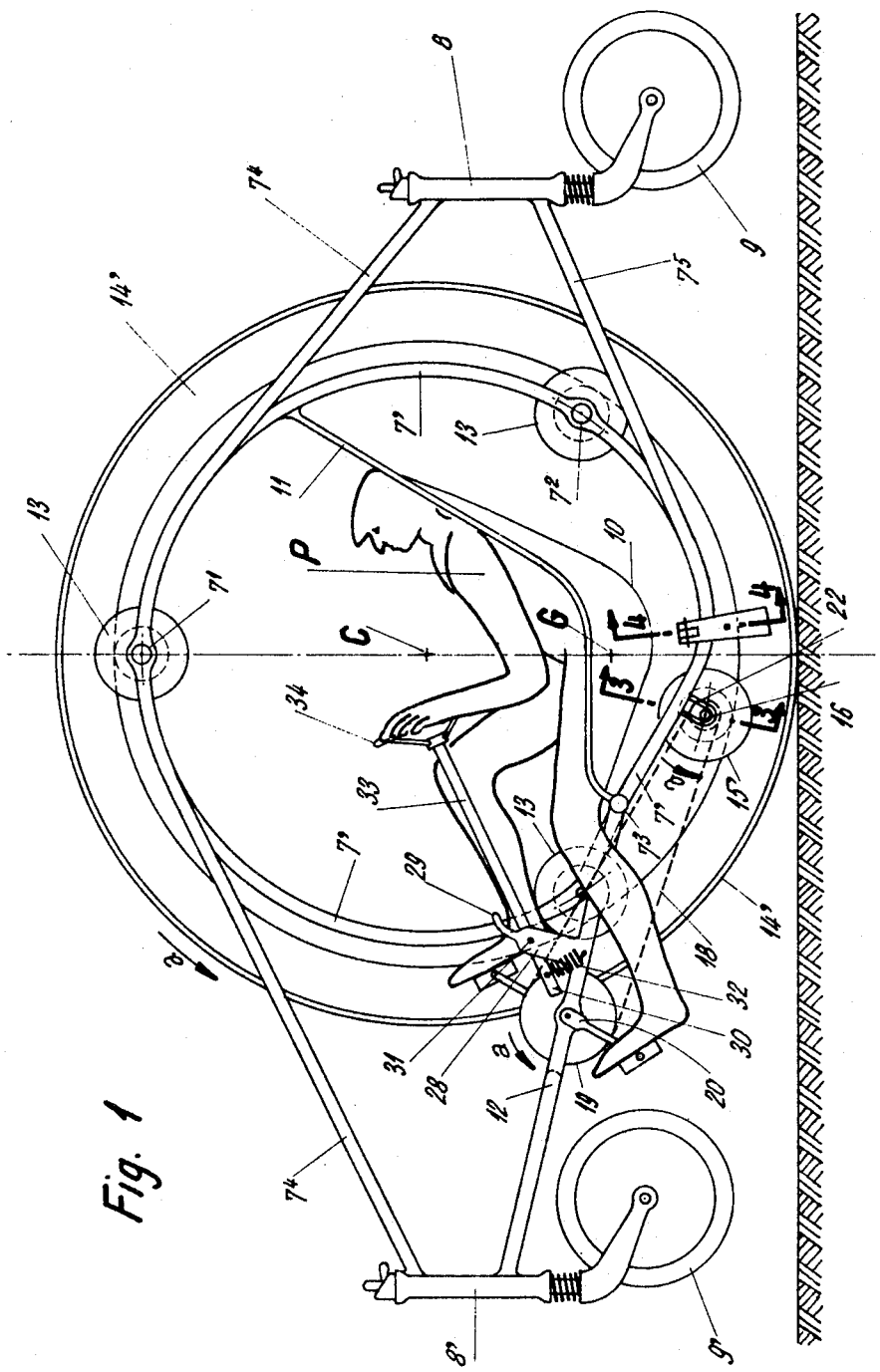
FIGURE 1 is a side elevational view, taken on the line 1—1 of FIG. 2, of a vehicle according to the present invention.

Referring now to the drawings in greater detail, there is shown a vehicle according to the present invention, comprising a vehicle body comprised of two substantially circular metal tubes 7 and 7' which are interconnected by cross members $7^1$, $7^2$ and $7^3$. The body is also comprised of forwardly and rearwardly extending frame members $7^4$ and $7^5$ which carry upright sleeves 8 and 8' which in turn carry swiveling or self-aligning caster wheel 9 and 9' which swivel about vertical axes in sleeves 8 and 8' and are normally spaced above the level of the ground but are engageable with the ground to limit the fore-and-aft tilting movement of the vehicle body.

The body of the vehicle supports a seat 10 by means of tubular members 11 secured to 7 and 7'. A forked member 12 extends between 8' and $7^3$ and supports the driving and steering mechanisms to be described later.

The body of the vehicle is provided with three pairs of grooved rollers 13 which turn freely on their respective parallel horizontal axes on cross members $7^1$, $7^2$ and $7^3$. The grooves of these rollers 13 engage flanges or support surfaces on a pair of ground-engaging wheels 14 and 14', which are coaxial and laterally spaced apart. There are at least three pairs of rollers 13 and they are preferably spaced at substantial angular distances from each other about the wheels 14 and 14', thereby to support the vehicle body on the ground-engaging wheels.

A pair of drive wheels in the form of grooved rollers 15 and 15' are provided, which are carried by the body and rotate about an axis parallel to the axes of the rollers 13 and the ground-engaging wheels 14 and 14'. The drive rollers 15 and 15' are fixedly secured to the ends of a drive shaft 16 which carries a pinion 17 that is engaged by a drive chain 18 driven by a sprocket 19 provided with pedals 20, the latter structure being disposed within and supported by the forked member 12. When the passenger P pedals, as shown in FIG. 1, rollers 15 and 15' are driven to ride forwardly or toward the left along the supporting surfaces of ground-engaging wheels 14 and 14', so that the center of gravity of the vehicle body (this term being used to denote the center of gravity of the vehicle body and its load or passenger) moves to the left as seen in FIG. 1 until it is horizontally displaced from the axis C of the ground-engaging wheels, whereupon the wheels 14 and 14' also move to the left to correct this unstable equilibrium, so that pedaling in the direction $a$ causes the rollers 15 and 15' and the wheels 14 and 14' also to turn in the direction $a$ thereby to propel the vehicle.

Means are provided for selectively individually or simultaneously moving the drive rollers 15 and 15' toward and away from the ground-engaging wheels 14 and 14', that is, respectively into and out of driving engagement with the ground-engaging wheels thereby to drive the vehicle or disengage the drive of the vehicle, or to steer by driving. These means are best shown in FIG. 3. As is there shown, the frame members 7 and 7' are interconnected with a casing 22 in which shaft 16 is disposed, by means of coil compression springs 21 and 21', and also by yokes 26 and 26' that may be selectively raised or lowered by the turning of levers 24 and 24' on inclined surfaces 25 and 25' fixed to frame members 7 and 7', under the urging of cables 23 and 23'. As seen in FIG. 3, tension on cable 23 or 23' in a direction to swing lever 24 or 24' away from the observer and out of the plane of the figure will raise the corresponding yoke 26 or 26' to disengage the associated drive roller 15 or 15'.

Means are also provided for simultaneously or selectively braking the ground-engaging wheels 14 and 14'. These means are best seen in FIG. 4. Again, they are actuated by the cables 23 and 23' and comprise gripping or pincers-type brakes supported by frame members 7 and 7'. The cables 23 and 23' are connected to the brakes at 37 and 37' so that tension in the cable applies the brakes.

The mechanisms shown in FIGS. 3 and 4 are so associated that tension in a cable 23 or 23' will first disengage the corresponding drive roller 15 or 15', and then apply the corresponding brake 27 or 27'. The mechanism for selectively or simultaneously applying the desired amount of tension to the cables 23 and 23' is shown in FIGS. 5 and 6, in the form of a support 28 mounted on the forked member 12 and having a projection 29 thereon. A shaft 30 is mounted for vertical swinging movement on support 28 about a pivot 31 and is continuously urged toward an upright position by coil tension springs 32. Shaft 30 has a reduced upper end 30' on which is rotatably carried the lower end of a steering shaft 33 which carries a steering wheel 34 at its upper end.

At its lower end, steering shaft 33 carries two oppositely extending projections 35 and 35' which are secured respectively to the cables 23 and 23', the cables in turn being guided within flexible conduits 36 and 36' which bear against projection 29 and which are shown partly broken away in FIGS. 5 and 6. These cables are secured intermediate their ends to the ends of the levers 24 and 24', and at their far ends to the brakes 27 and 27' at 37 and 37'.

The steering wheel 34 and steering wheel shaft 33 provide a single operating member for braking and steering. In the position c shown in FIGS. 5 and 6, there is minimum tension in the cables 23 and 23' and the parts are in the position shown in FIGS. 3 and 4, with both drive rollers 15 and 15' in driving engagement with the ground-engaging wheels 14 and 14', and with both brakes 27 and 27' disengaged. Upon drawing back on the steering wheel from the position c to the position d shown in FIGS. 5 and 6, sufficient tension is imposed on the cables 23 and 23' to disengage both drive rollers 15 and 15', but not to apply the brakes 27 and 27'. In this position, the vehicle is free wheeling. Thereafter, upon pulling back to position f, both of the brakes 27 and 27' are simultaneously applied.

To steer, however, it is necessary only to turn the wheel 34 in the selected direction. Turning the wheel clockwise, as seen by the passenger, will cause the projection 35' to move through the positions d and f thereby to tension the cable 23' to the extent that the right-hand drive roller 15' (as seen by the passenger, it appearing as the left-hand drive roller in FIG. 3) will be disengaged and thereafter the brake 27' will be engaged selectively to brake the wheel 14', at the same time that the drive to the wheel 14 continues uninterrupted. Braking the right wheel and driving the left wheel causes the vehicle to turn to the right, which is the direction of movement of the vehicle corresponding to turning the steering wheel clockwise. Conversely, of course, turning the steering wheel counterclockwise steers the vehicle to the left.

It will be noted that these steering and braking movements are those which would normally be applied. They are, in fact, very similar to guiding a horse, when it is considered that one pulls on the right rein to cause the horse to turn right and pulls on the left rein to cause the horse to turn left, but pulls on both reins to slow or stop the horse. Similarly, the directions of turning movement of the steering wheel correspond to those of other vehicles.

It will of course be recognized that various modifications in the ground-engaging wheels may be made, so that they have any of a variety of ground-engaging surfaces. Similarly, the secondary wheels or casters 9 and 9' are subject to variation and may for instance be replaced by skids. Also, instead of providing a single passenger vehicle, vehicles may be made for a plurality of passengers who may or may not cooperate in driving the vehicle. Alternatively, the pedal drive may be replaced by a motor.

From a consideration of the foregoing disclosure, therefore, it will be evident that all of the initially recited objects of the present invention have been achieved. Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claim.

Having described my invention, I claim:

1. A vehicle having coaxial ground-engaging wheels having annular support surfaces thereon, a vehicle body, means supporting the vehicle body for movement on and along said support surfaces, and means for driving said body along said support surfaces so that when the center of gravity of said body is horizontally displaced from the axis of said wheels in one direction, the vehicle will move in said one direction, said support means comprising a plurality of wheels substantially smaller than said ground-engaging wheels and rotatable about spaced parallel axes and riding on said support surfaces, said drive means comprising a pair of said smaller wheels one engageable with each of said ground-engaging wheels, said control means comprising a control member and means driven by said control member whereby upon rotation of said control member in said one direction said drive wheel associated with said one ground-engaging wheel is moved away from said one ground-engaging wheel to interrupt the drive of said one ground-engaging wheel and said brake means is applied to said one ground-engaging wheel, while upon rotation of said control member in said other direction said drive wheel associated with said other ground-engaging wheel is moved away from said other ground-engaging wheel to interrupt the drive of said other ground-engaging wheel and said brake means is applied to said other ground-engaging wheel, and upon swinging movement of said control member in a given direction both said drive wheels are moved away from said ground-engaging wheels thereby simultaneously to interrupt the drive of both of said ground-engaging wheels while upon further swinging movement of said control member in said given direction said brake means are applied simultaneously to both of said ground-engaging wheels.

References Cited

UNITED STATES PATENTS

| | | | |
|---|---|---|---|
| 1,313,095 | 8/1919 | Lauterbur | 180—10 |
| 1,829,266 | 10/1931 | Drew et al. | 280—206 X |
| 2,107,766 | 2/1938 | Rose | 180—10 |

OTHER REFERENCES

| | | |
|---|---|---|
| 127,311 | 5/1948 | Australia. |
| 859,583 | 6/1940 | France. |

KENNETH H. BETTS, *Primary Examiner.*